United States Patent
Jiang et al.

(10) Patent No.: US 9,720,429 B2
(45) Date of Patent: Aug. 1, 2017

(54) SENSING A SWITCHING-POWER-SUPPLY PHASE CURRENT

(71) Applicant: Intersil Americas LLC, Milpitas, CA (US)

(72) Inventors: Shuai Jiang, San Jose, CA (US); Jian Yin, San Ramon, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 14 days.

(21) Appl. No.: 14/627,089

(22) Filed: Feb. 20, 2015

(65) Prior Publication Data

US 2016/0012965 A1  Jan. 14, 2016

Related U.S. Application Data (63) Continuation of application No. 14/575,501, filed on Dec. 18, 2014.
(Continued)

(51) Int. Cl.
*H02M 3/335* (2006.01)
*G05F 1/00* (2006.01)
(Continued)

(52) U.S. Cl.
CPC ............. *G05F 1/62* (2013.01); *H01F 27/402* (2013.01); *H02M 3/158* (2013.01);
(Continued)

(58) Field of Classification Search
CPC .......... H01F 27/402; G05F 1/62; H02M 3/33; H02M 3/15

USPC ........ 336/105, 220, 221, 212, 170; 361/811, 361/86; 324/126, 127; 323/271, 222, 323/224, 282–290, 275, 272, 277, 266; 363/50, 98, 56.02, 132
See application file for complete search history.

(56) References Cited

U.S. PATENT DOCUMENTS 4,684,827 A  8/1987  Ohms
5,490,055 A  2/1996  Boylan et al.
(Continued)

OTHER PUBLICATIONS

U.S. Patent and Trademark Office, "Office Action", "from U.S. Appl. No. 14/575,501", Jan. 6, 2016, pp. 1-16, Published in: US.
(Continued)

*Primary Examiner* — Mangtin Lian
(74) *Attorney, Agent, or Firm* — Foley & Lardner LLP; Mark J. Danielson (57) ABSTRACT

In an embodiment, a coupled-inductor structure includes first and second windings. The first winding is configured to conduct a phase current, has a first node configured for coupling to a phase node of a power supply, and has a second node configured for coupling to an output node of the power supply and to a first node of a sense impedance that is configured to generate a sense signal representative of the phase current. And the second winding is configured for magnetic coupling with the first winding, has a first node coupled to the first node of the first winding, and has a second node configured for coupling to a second node of the sense impedance. For example, the first winding may be a phase inductor of a switching power supply, and the impedance may be a capacitor that generates a sense voltage representative of the phase current.

13 Claims, 8 Drawing Sheets

Related U.S. Application Data (60) Provisional application No. 62/022,886, filed on Jul. 10, 2014, provisional application No. 62/086,933, filed on Dec. 3, 2014.

(51) Int. Cl.

| | | |
|---|---|---|
| G05F 5/00 | (2006.01) | |
| H01F 17/04 | (2006.01) | |
| G05F 1/62 | (2006.01) | |
| H01F 27/40 | (2006.01) | |
| H02M 3/158 | (2006.01) | |
| H02M 1/00 | (2006.01) | |

(52) U.S. Cl.
CPC .. *H02M 3/1584* (2013.01); *H02M 2001/0009* (2013.01); *H02M 2001/0064* (2013.01)

(56) References Cited

U.S. PATENT DOCUMENTS

| | | | |
|---|---|---|---|
| 6,229,725 B1 | 5/2001 | Nielsen | |
| 7,233,132 B1* | 6/2007 | Dong | H02M 3/1584 323/272 |
| 7,358,710 B2 | 4/2008 | Luo et al. | |
| 8,368,368 B2 | 2/2013 | Qiu et al. | |
| 2003/0080723 A1 | 5/2003 | Chen et al. | |
| 2006/0062028 A1 | 3/2006 | Powers et al. | |
| 2008/0130334 A1 | 6/2008 | Halberstadt | |
| 2008/0197823 A1 | 8/2008 | Crowther et al. | |
| 2010/0109648 A1* | 5/2010 | Cheung | G01R 15/181 324/126 |
| 2010/0327838 A1 | 12/2010 | Melanson | |
| 2011/0228507 A1 | 9/2011 | Yin et al. | |
| 2012/0319478 A1 | 12/2012 | Gentchev et al. | |
| 2014/0016371 A1* | 1/2014 | Chandrasekaran | H01F 27/28 363/21.12 |
| 2015/0249391 A1* | 9/2015 | Yang | H02M 3/33576 363/21.01 |

OTHER PUBLICATIONS

Bob Mammano, "Current sensing solutions for power supply designers," TI application notes, 2001; pp. 35.

Asha Patel and Mehdi Ferdowsi, "Current Sensing for Automotive Electronics—A Survey", IEEE Transactions on Vehicular Technology, vol. 58, No. 8, Oct. 2009; 12 pages.

U.S. Patent and Trademark Office, "Notice of Allowance", "from U.S. Appl. No. 14/575,501", Jul. 14, 2016, pp. 1-12, Published in: US.

* cited by examiner

SENSING A SWITCHING-POWER-SUPPLY PHASE CURRENT

PRIORITY CLAIM

The present application claims priority to United States Provisional Patent Application Nos. 62/022,886, filed 10 Jul. 2014, and 62/086,933 filed 3 Dec. 2014; both of which applications are incorporated herein by reference in their entireties.

SUMMARY

In an embodiment, a coupled-inductor structure includes first and second windings. The first winding is configured to conduct a current, has a first node configured for coupling to a phase node of a power supply, and has a second node configured for coupling to an output node of the power supply and to a first node of a sense impedance that is configured to generate a sense signal representative of the current. And the second winding is configured for magnetic coupling with the first winding, has a first node coupled to the first node of the first winding, and has a second node configured for coupling to a second node of the sense impedance.

For example, in an embodiment of such a structure, the first winding may be a phase inductor of a switching power supply, and the impedance may be a series resistor-capacitor network that is in series with the second winding and that generates a sense voltage representative of the phase current through the phase inductor.

As compared to conventional sensing circuits, a sensing circuit incorporating the above-described structure may have a smaller time constant, may generate a sense voltage that is less dependent on temperature and phase inductance, and may thus ameliorate, or even eliminate, one or more problems associated with conventional sensing circuits. For example, as compared to conventional sensing circuits, even where there is a time-constant mismatch between the main (first winding) leg and the sense impedance of the above-described sensing circuit, the settling time of the sense voltage, and thus the response time of a power supply incorporating such a sensing circuit to a load variation, may be faster. Furthermore, as compared to conventional sensing circuits, for a given over-current-protection (OCP) threshold, the above-described sensing circuit may allow the phase inductor to be smaller, and may even allow the OCP threshold to be above the saturation current of the phase inductor.

DETAILED DESCRIPTION

Figure 1:
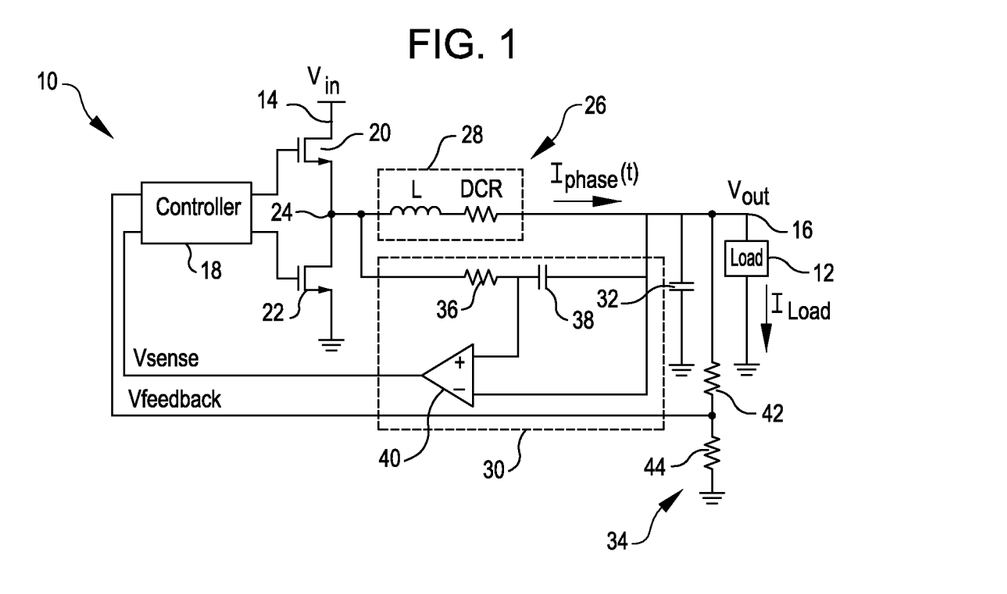
FIG. 1 is a diagram of a load and of a power supply that includes a sense circuit that is configured to generate a sense signal that represents a phase current of the power supply.

FIG. 1 is a schematic diagram of a power supply, here a single-phase buck converter (sometimes called a buck regulator) 10, and a load 12, which receives power from the buck converter, according to an embodiment. The buck converter 10 converts an input signal, here an input voltage $V_{in}$, on an input node 14 into a regulated output signal, here a regulated output voltage $V_{out}$, on an output node 16, where $V_{out} < V_{in}$; for example, $V_{in}=3.3$ Volts (V) and $V_{out}=1.3$ V. And the load 12 may include any type of load, such as an integrated computing circuit like a microprocessor or microcontroller. One may model the load 12 as a purely resistive impedance, although it is contemplated that the load may include capacitive and inductive impedance components (i.e., may be modeled as a complex impedance), and may change its impedance to change its current-consumption state (e.g., transition from an "awake" state to a "sleep" state and vice-versa). Consequently, the buck converter 10 is configured to regulate $V_{out}$ to a set voltage level over a range of load impedances and a range of load currents $I_{Load}$.

The buck converter 10 includes a power-supply controller 18, high-side and low-side NMOS switching transistors 20 and 22 coupled together at a phase node 24, a phase 26 including a phase inductor 28, a phase-current sense circuit 30, an output capacitor 32, and a feedback network 34. The phase inductor 28 may be modeled as including an ideal inductor having an inductance L and a series equivalent resistor DCR, and the sense circuit 30 includes a resistor 36, a sense capacitor 38, and an amplifier 40. Furthermore, the feedback network 34 includes a voltage divider formed by resistors 42 and 44. The buck converter 10 can also include other components and circuitry that are omitted for brevity. One or more of the components of the buck converter 10, or a respective portion therefore, may be disposed on a same integrated-circuit die as the power-supply controller 18; for example, the switching transistors 20 and 22 may be disposed on such an integrated-circuit die. Furthermore, the power-supply controller 18, and a portion or all of any other one or more components that are not disposed on the power-supply controller, may be disposed within a packaged power-supply module.

In operation, the controller 18 controls the duty cycles of the transistors 20 and 22 for the purpose of regulating $V_{out}$ to a voltage level that is set by the feedback network 34. While the high-side transistor 20 is on and the low-side transistor 22 is off, the high-side transistor couples the phase node 24 to $V_{in}$ such that a phase current $I_{phase}(t)$ flows through the inductor 28 and increases approximately linearly (i.e., ramps upwardly); conversely, while the high-side transistor is off and the low-side transistor is on, the low-side transistor couples the phase node 24 to ground such that $I_{phase}(t)$ decreases approximately linearly (i.e., ramps downwardly). Therefore, the inductor 28 and the output capacitor 32 effectively low-pass filter the switching signal (which alternates between $V_{in}$ and ground) at the phase node 24 such that $V_{out}$ is a relatively constant DC voltage. The controller 18 monitors $V_{out}$ via a voltage $V_{feedback}$ generated by the feedback network 34. If $V_{out}$ falls below the voltage level $$\frac{V_{feedback} \cdot (R_{42}+R_{44})}{R_{44}}$$

($R_{42}$ and $R_{44}$ are the values of the resistors 42 and 44, respectively) set by the feedback network 34, then the controller 18 increases the duty cycle of the high-side transistor 20 so as to increase $V_{out}$ back toward the voltage level set by the feedback network; conversely, if $V_{out}$ rises above the voltage level set by the feedback network, then the controller 14 decreases the duty cycle of the high-side transistor so as to decrease $V_{out}$ back toward the voltage level set by the feedback network.

The power-supply controller 18 also controls the switching of the transistors 20 and 22 in response to the phase-current sense voltage $V_{sense}(t)$, which represents the magnitude and phase of the phase current $I_{phase}(t)$, and which is equal to the product of the voltage across the sense capacitor 38 and the gain of the amplifier 40. For example, the controller 18 may limit the duty cycle of the high-side transistor 20 so that the peak of $I_{phase}(t)$ does not exceed a threshold; the controller may perform such limiting to implement overcurrent protection (OCP) when, for example, the output node 16 of the buck converter 10 is short-circuited to ground. Or during a light-load condition while the buck converter 10 is operating in a pulse-frequency-modulation (PFM) mode, the controller 18 may control the duty cycle of the high-side transistor 20 to generate pulses of $I_{phase}(t)$ having a set peak value. Alternatively, if the buck converter 10 has N>1 phases 26, then the controller 18 may control the duty cycles of the transistors 20 and 22 of the phases in response to respective sense voltages $V_{sense1}(t)$–$V_{senseN}(t)$ for the purpose of balancing the phase currents $I_{phase1}(t)$–$I_{phaseN}(t)$, i.e., causing the phase currents $I_{phase1}(t)$–$I_{phaseN}(t)$ to each have an approximately same average current level. The controller 18 may also implement current-mode control of the buck-converter 10, or active voltage positioning (AVP), in response to $V_{sense}(t)$.

Unfortunately, as explained below, the phase-current sense circuit 30 may generate the sense voltage $V_{sense}(t)$ too inaccurately for some applications. In some cases, $V_{sense}(t)$ may be so inaccurate that it may cause the buck converter 10 to operate improperly, or even to become damaged.

Assuming for purposes of the following discussion that the sense-signal amplifier 40 has unity gain, under ideal conditions, $V_{sense}(s)$, which is a function of frequency, has the same wave shape and phase as $I_{phase}(s)$ over all frequencies, and has a magnitude that is related to the magnitude of $I_{phase}(s)$ by a constant scale factor DCR over all frequencies, as described below.

Under ideal conditions, $V_{sense}(s)$ is given by the following equation:

$$V_{sense}(s) = I_{Phase}(s) \cdot DCR \frac{1+s\frac{L}{DCR}}{1+sR_{36}C_{38}} \quad (1)$$

where $R_{36}$ represents the resistance of the resistor 36, and $C_{38}$ represents the capacitance of the sense capacitor 38.

Also under ideal conditions, DCR and the inductance L of the inductor 28 are constant relative to, i.e., are independent of, $I_{phase}(s)$ and temperature, and $R_{36}$ and $C_{38}$ are also constant relative to $I_{phase}(s)$ and temperature.

Therefore, if one sets $$\frac{L}{DCR} = R_{36}C_{38},$$

then equation (1) reduces to:

$$V_{sense}(s)=I_{phase}(s) \cdot DCR \quad (2)$$

and $$\frac{V_{sense}(s)}{I_{phase}(s)} = DCR = \text{Gain}_{sense\_circuit} \quad (3)$$

over all frequencies such that $V_{sense}(s)$ is related to $I_{phase}(s)$ by a constant scale factor, i.e., gain, DCR as described above.

But in actuality, DCR may vary with temperature; for example, DCR may drift by up to ±30% from its nominal value over an approximate temperature range of 25° C.-100° C.

Furthermore, the inductance L of the phase inductor 28 may vary with temperature and with the magnitude of $I_{phase}(s)$ as discussed below in conjunction with FIGS. 1-3.

Figure 2:
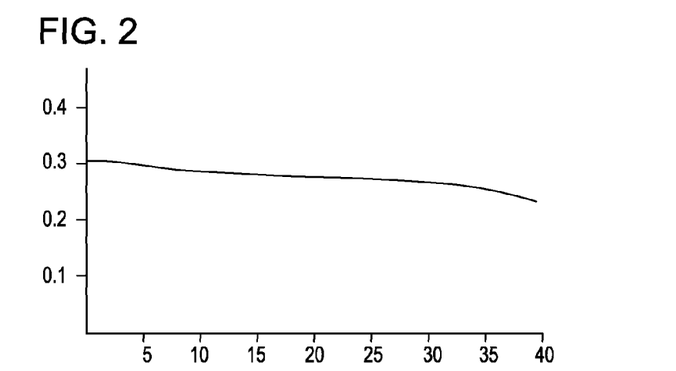
FIG. 2 is a plot of an inductance of, versus a current through, an inductor having a soft-saturation core.

FIG. 2 is a plot of the inductance L versus the magnitude of $I_{phase}(t)$ for an example soft-saturation-core version of the phase inductor 28 of FIG. 1.

Figure 3:
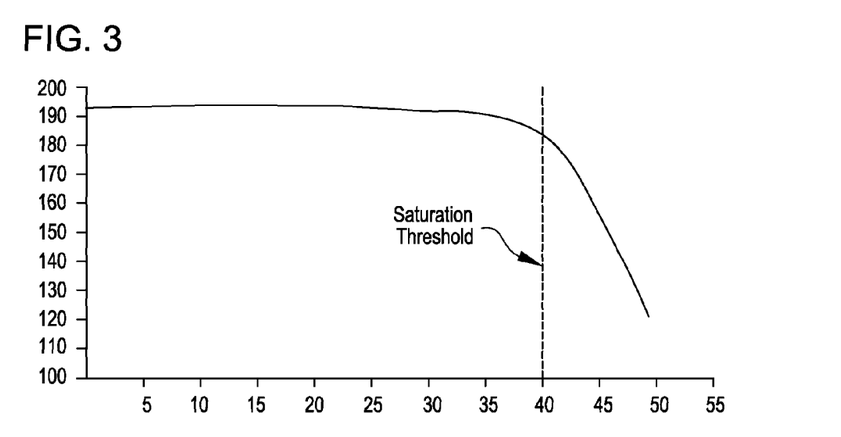
FIG. 3 is a plot of an inductance of, versus a current through, an inductor having a hard-saturation core.

FIG. 3 is a plot of the inductance L versus the magnitude of $I_{phase}(t)$ for an example hard-saturation-core version of the phase inductor 28 of FIG. 1.

Referring to FIGS. 1-2, even disregarding the dependence of the inductance L on temperature, the inductance L of a soft-saturation-core version of the phase inductor 28 still changes by approximately 30% of its maximum value as the magnitude of $I_{phase}(t)$ increases from 0 to 40 Amperes (A).

And referring to FIGS. 1 and 3, even disregarding the dependence of the inductance L on temperature, the inductance L of a hard-saturation-core version of the phase inductor 28 still falls sharply by approximately 30% of its maximum value over a range of approximately 10 A if the magnitude of $I_{phase}(t)$ becomes greater than a saturation threshold of approximately 40 A.

Referring to FIGS. 1-3, due to such current-and-temperature-induced changes in DCR and L, the time constants $$\frac{L}{DCR}$$

and $R_{36}C_{38}$ are mismatched $$\left(\frac{L}{DCR} \neq R_{36}C_{38}\right)$$

for at least some frequencies of interest such that $V_{sense}(s)$ varies with frequency per equation (1). Some problems that may be caused by such a time-constant mismatch are described below in conjunction with FIGS. 1 and 4-6.

Figure 4:
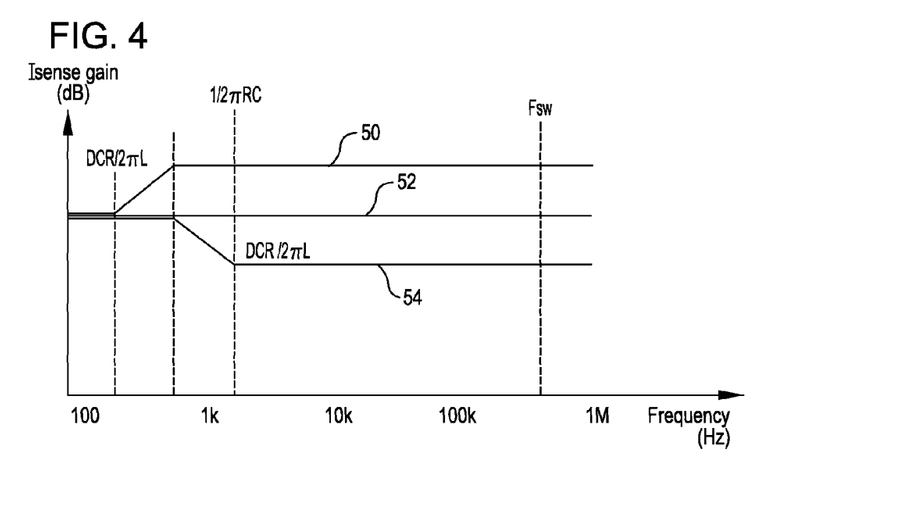
FIG. 4 is an overlay of Bode plots of underdamped, critically damped, and overdamped gains of the sense circuit of FIG. 1.

FIG. 4 is a Bode plot of underdamped, critically damped (ideal), and overdamped gains $$\left(\frac{V_{sense}(s)}{I_{phase}(s)}\right)$$

50, 52, and 54 of an example of the sense circuit 30 of FIG. 1.

Figure 5:
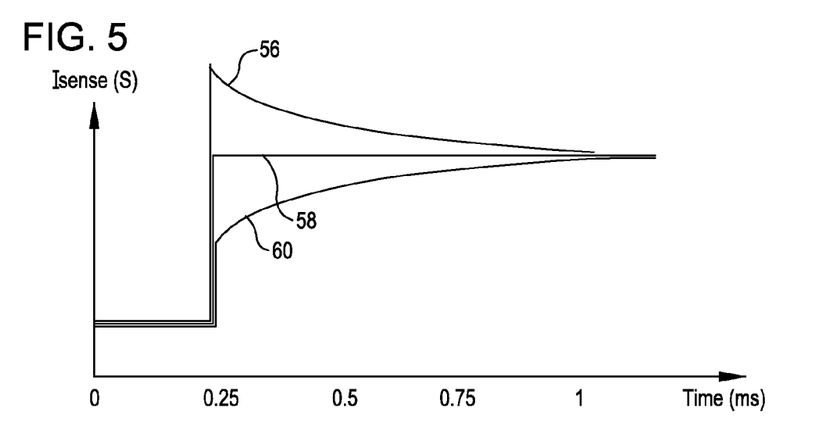
FIG. 5 is an overlay of time-domain plots of underdamped, critically damped, and over damped step responses of the sense circuit of FIG. 1.

FIG. 5 is a time-domain plot of underdamped, critically damped (ideal), and overdamped step responses 56, 58, and 60 of the same example of the sense circuit 30 of FIG. 1.

Referring to FIGS. 1 and 4-5, the values of $R_{36}$, $C_{38}$, L, and DCR typically are such that the zero $$\frac{DCR}{2\pi L}$$

and the pole $$\frac{1}{2\pi R_{36}C_{38}}$$

or equation (1) are at relatively low frequencies, e.g., on the order of 0 Hz-2 KHz, that are well below the power-supply switching frequency $F_{sw}$, which is about 600 KHz in the described example.

Consequently, if the pole frequency is greater than the zero frequency, then, in the frequency domain, the sense circuit 30 exhibits an underdamped gain $$\left(\frac{V_{sense}(s)}{I_{phase}(s)}\right)$$

50, and in the time domain, the sense circuit exhibits an underdamped, i.e., leading, step response ($V_{sense}(t)$) 56—the step response $V_{sense}(t)$ is the response of the sense circuit 30 to a step increase/decrease in the phase current $I_{phase}(s)$, and, therefore, in response to a step increase/decrease in the load current $I_{Load}$.

If the pole frequency equals the zero frequency, then, in the frequency domain, the sense circuit 30 exhibits a critically damped (ideal) gain 52, and, in the time domain, the sense circuit exhibits an ideal, i.e., critically damped, step response 58.

And if the pole frequency is less than the zero frequency, then, in the frequency domain, the sense circuit 30 exhibits an overdamped gain 54, and, in the time domain, the sense circuit exhibits an overdamped, i.e., lagging, step response 60.

Unfortunately, the distortion of $V_{sense}(t)$ from its ideal (critically damped) wave shape due to such a time-constant mismatch $$\left(\text{i.e., } \frac{L}{DCR} \neq R_{36}C_{38}\right)$$

at one or more frequencies may cause problems with the control and operation of the buck converter 10.

For example, such distortion of $V_{sense}(t)$ may degrade the feedback-loop performance of the buck converter 10 if $V_{sense}(t)$ is fed back to the power-supply controller 18 for current-mode control, phase-current balancing, or adaptive voltage positioning (AVP); such performance degradation is due to the effective speed of the current-control loop (the feedback loop including the sense circuit 30) being reduced (i.e., the phase shift of the loop being increased) because the controller must "wait" for $V_{sense}(t)$ to settle before "trusting" the value of $V_{sense}(t)$.

Or an underdamped (i.e., leading) gain 50 and step response 56 may cause premature activation of over-current protection because the overshoot on $V_{sense}(t)$ may cause the amplitude of $I_{phase}(t)$ to appear higher than it actually is until $V_{sense}(t)$ settles.

Conversely, an overdamped (i.e., lagging) gain 54 and step response 60 may delay activation of over-current protection because the undershoot on $V_{sense}(t)$ may cause the amplitude of $I_{phase}(t)$ to appear lower than it actually is until $V_{sense}(t)$ settles; therefore, such an overdamped step response may increase the chances that an over-current event could damage one or more components of the buck converter 10. An example of such a delay in the controller's implementation of over-current protection is discussed below in conjunction with FIGS. 1, 3, and 6.

Figure 6:
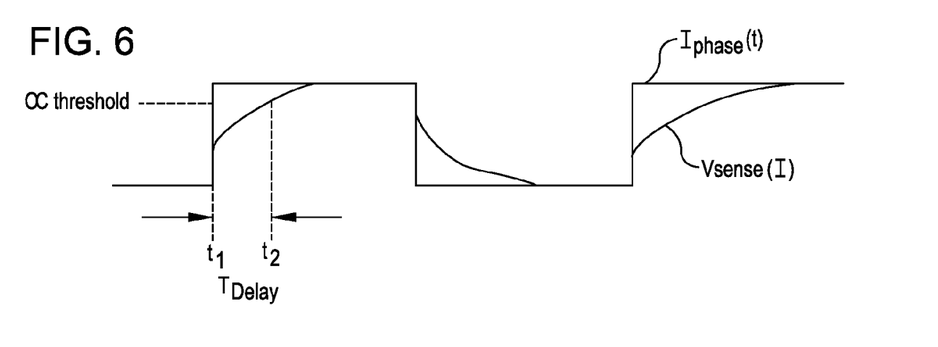
FIG. 6 is an overlay of time domain plots of an actual phase current of the power supply of FIG. 1 and of an overdamped sense signal that the sense circuit of FIG. 1 generates in response to the actual phase current.

FIG. 6 is a plot of $I_{phase}(t)$ and an overdamped, i.e., lagging, $V_{sense}(t)$.

Referring to FIGS. 3 and 6, a supply-damaging overcurrent event may occur if the phase inductor 28 is a hard-saturation-core inductor and the over-current threshold $OC_{threshold}$ is set above the inductor saturation threshold (approximately 40 A in FIG. 3). Because L drops sharply if the amplitude of $I_{phase}(t)$ is above the saturation threshold, if the amplitude of $I_{phase}(t)$ increases above the saturation threshold, then the zero $$\frac{DCR}{2\pi L}$$

of equation (1) becomes significantly higher than the pole $$\frac{1}{2\pi R_{36} C_{38}}$$

of equation (1), and, as a result, the sense circuit 30 overdamps $V_{sense}(t)$. Referring to FIG. 6, if the amplitude of $I_{phase}(t)$ steps upward to a level that is greater than $OC_{threshold}$, then the overdamping of $V_{sense}(t)$ causes a delay $T_{delay}$ between a time $t_1$ when the amplitude of $I_{Phase}(t)$ first equals or exceeds $OC_{threshold}$, and a time $t_2$ when the amplitude of $V_{sense}(t)$ is high enough to indicate that the amplitude of $I_{phase}(t)$ has exceeded $OC_{threshold}$. It $T_{delay}$ is too long, then the buck converter 10, or the load 12, may malfunction, or even be permanently damaged, by the excessive magnitude of $I_{phase}(t)$, or by an excessive magnitude of $V_{out}$ resulting from the excessive magnitude of $I_{phase}(t)$. And if L becomes too low such that the zero $$\frac{DCR}{2\pi L}$$

becomes too high, $V_{sense}(t)$ may never even reach the level of $OC_{threshold}$ such that an over-current condition of the buck converter 10 may exist indefinitely, or at least until the buck converter or load 12 is catastrophically damaged.

Referring to FIGS. 1 and 4-5, although techniques exist for compensating for the temperature drift of DCR, none of these techniques compensates for the drift of L with temperature or with inductor current. Consequently, such techniques may not compensate for the above-described time-constant mismatch sufficiently to avoid, or even to ameliorate significantly, the above-described potential problems with the sense circuit 30.

Figure 7:
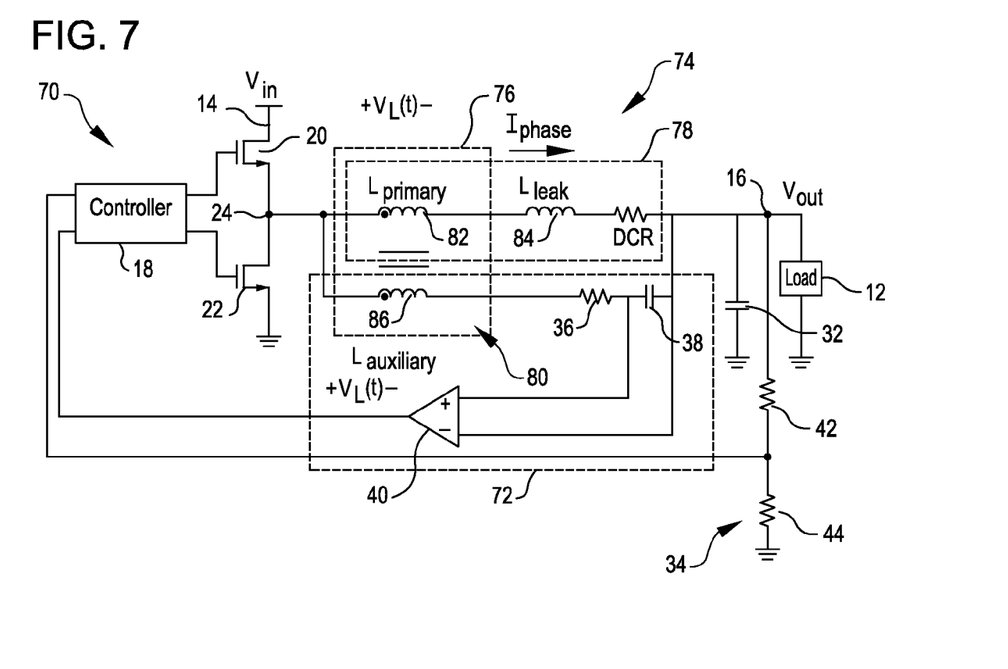
FIG. 7 is a diagram of a load and of a power supply that includes a sense circuit that is configured to generate a sense signal that represents a phase current of the power supply, according to an embodiment.

FIG. 7 is a diagram of the load 12, and a buck converter 70, which powers the load and which includes a phase-current sense circuit 72, according to an embodiment. As described below, the sense circuit 72 is configured to ameliorate or eliminate one or more of the above-described potential problems with the phase-current sense circuit 30 of FIG. 1. Furthermore, in FIG. 7, like numerals reference like components common to the buck converter 10 of FIG. 1 and the buck converter 70.

In addition to the power-supply controller 18, high-side and low-side transistors 20 and 22, output capacitor 32, and feedback network 34, the buck converter 70 includes a phase 74, which includes the sense circuit 72 and a coupled-inductor structure 76.

The coupled-inductor structure 76 includes a primary winding 78, which forms a phase inductor, and an auxiliary winding 80, which is configured to be magnetically coupled to the primary winding while a current $I_{phase}(t)$ flows through the primary winding.

And the sense circuit 72 includes the sense resistor 36, the sense capacitor 38, the sense-signal amplifier 40, and the auxiliary winding 80. That is, a main difference between the sense circuit 30 of FIG. 1 and the sense circuit 72 is the addition of the auxiliary winding 80.

Referring again to the coupled-inductor structure 76, the primary winding 78 includes, or may be modelled as including, a coupling inductor 82 having a coupling inductance $L_{primary}$, a series-equivalent resistor DCR, and a leakage inductor 84 having a leakage inductance $L_{leak}$.

And the auxiliary winding 80 includes, or may be modelled as including, a coupling inductor 86 having a coupling inductance $L_{auxiliary}$; in an embodiment, the turns ratio between the auxiliary winding and portion of the primary winding 78 forming the coupling inductor 82 is 1:1 such that $L_{primary}$ is approximately equal to $L_{auxiliary}$. And although the auxiliary winding 80 includes, or may be modelled as including, a series-equivalent resistor and a leakage inductor, the values of these two components are negligible for the applications described herein; therefore, these two components are omitted from FIG. 7.

The operation of the sense circuit 72 and the coupled-inductor structure 76 are now described according to an embodiment; in other aspects, the operation of the buck converter 70 may be similar to the above-described operation of the buck converter 10 of FIG. 1.

As the phase current $I_{phase}(t)$ flows through the primary winding 78, a voltage $V_L(t)$ exists across the primary inductor 82.

Assuming that the turns ratio between auxiliary winding 80 and the portion of the primary winding 78 that forms the primary inductor 82 is approximately 1:1, because the primary inductor and the auxiliary inductor 86 have a common node coupled to the phase node 24, approximately the same voltage $V_L(t)$ exists across the auxiliary inductor.

Consequently, the voltage across the series combination of the leakage inductor 84 and the series-equivalent resistor DCR is approximately the same as the voltage across the series combination of the resistor 36 and the sense capacitor 38 because these two series combinations have a common node coupled to the output node 16.

As a result, the sense voltage $V_{sense}(s)$ across the sense capacitor 38 is given by the following equation:

$$V_{sense}(s) = I_{Phase}(s) \cdot DCR \frac{1 + s\frac{L_{leak}}{DCR}}{1 + sR_{36}C_{38}} \quad (4)$$

Equation (4) is the same as equation (2) except that the zero depends on the inductance $L_{leak}$ of the leakage inductor 84 instead of on the inductance L of the phase inductor 28 of FIG. 1. With reference to the sense circuit 72, this means that the zero depends on $L_{leak}$ instead of on the inductance $L_{primary}$ of the coupling inductor 82.

As discussed below, including the coupled-inductor structure 76 in the buck converter 10 to cause the zero of $V_{sense}(s)$ to depend on the leakage inductance $L_{leak}$ instead of on the phase inductance L of FIG. 1 may ameliorate or eliminate one or more of the above-described potential problems with the sense circuit 30 of FIG. 1.

Unlike the inductance L of the phase inductor 28 of FIG. 1, and unlike the inductance $L_{primary}$ of the coupling inductor 82, the leakage inductance $L_{leak}$ does not vary substantially with, and is thus substantially independent of, the phase current $I_{phase}(t)$ and temperature; therefore, the above-described time-constant mismatch may be reduced, because the current and temperature dependencies of L no longer affect $V_{sense}(s)$ (the time-constant mismatch caused by the temperature dependency of DCR may still be present, however).

And even though $L_{leak}$ may have higher tolerance (e.g., ±20%) from its nominal value than L and $L_{primary}$ do, the errors caused by this tolerance-induced zero/pole mismatch are typically smaller than errors caused by the temperature-and-current-drift-induced zero/pole mismatch described above in conjunction with FIG. 1. These typically smaller errors are because even if $L_{leak}$ is different from its nominal value, $L_{leak}$ remains relatively constant with changes in temperature and in the magnitude of $I_{phase}(t)$.

Furthermore, as describe below in conjunction with FIGS. 7-9, because $L_{leak}$ is typically much smaller than L and $L_{primary}$, $V_{sense}(t)$ generated by the sense circuit 72 may be better able to track $I_{phase}(t)$ than $V_{sense}(t)$ generated by the sense circuit 30 of FIG. 1, or $V_{sense}(t)$ generated by a sense circuit in which the zero depends on $L_{primary}$.

Figure 8:
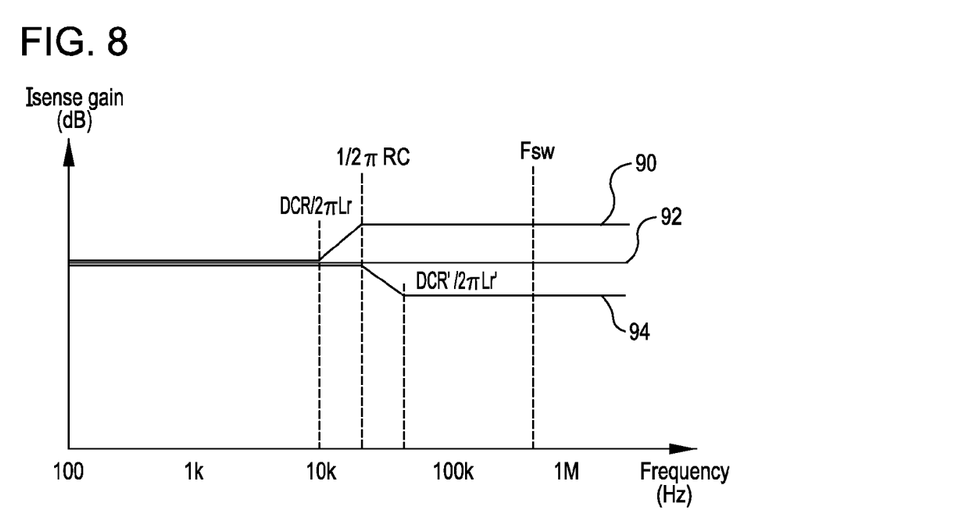
FIG. 8 is an overlay of Bode plots of underdamped, critically damped, and overdamped gains of the sense circuit of FIG. 7, according to an embodiment.

FIG. 8 is a Bode plot of the underdamped, critically damped (ideal), and overdamped gains $$\left(\frac{V_{sense}(s)}{I_{phase}(s)}\right)$$

90, 92, and 94 of the sense circuit 72 of FIG. 7, according to an embodiment.

Figure 9:
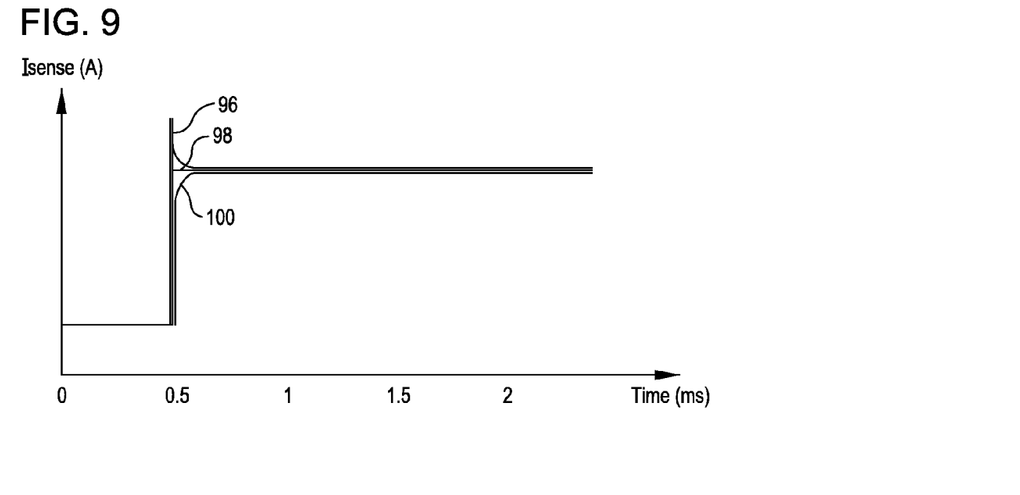
FIG. 9 is an overlay of time-domain plots of underdamped, critically damped and overdamped step responses of the sense circuit of FIG. 1, according to an embodiment.

FIG. 9 is a time-domain plot of the underdamped, critically damped (ideal), and overdamped step responses 96, 98, and 100 of the sense circuit 72 of FIG. 7, according to the same embodiment.

Referring to FIGS. 7-9, because the leakage inductance $L_{leak}$ is significantly smaller than the phase inductance L of FIG. 1 (and significantly smaller than $L_{primary}$), $R_{36}$ and $C_{38}$ of the sense circuit 72 may also be smaller as compared to the resistance and capacitance values of the sense circuit 30 of FIG. 1 (or of a sense circuit in which the zero depends on $L_{primary}$), therefore, the pole and zero of equation (4) may be at significantly higher frequencies than the pole and zero of equation (1), and may be closer to the power-supply switching frequency $F_{sw}$ than are the pole and zero of equation (1).

A result of the higher-frequency pole and zero of the sense circuit 72 is that even with a time-constant mismatch, the settling times of an underdamped and overdamped $V_{sense}(t)$ 96 and 100 generated by the sense circuit 72 are significantly shorter than the settling times of the underamped and overdamped $V_{sense}(t)$ 56 and 60 (FIG. 5) generated by the sense circuit 30 of FIG. 1.

Consequently, the sense voltage $V_{sense}(t)$ generated by the sense circuit 72 tracks $I_{phase}(t)$ more closely in amplitude than does $V_{sense}(t)$ generated by the sense circuit 30 of FIG. 1 (or by a sense circuit in which the zero depends on $L_{primary}$), and this closer tracking may reduce settling-time-induced errors and delays in the current-feedback loop, the chance of premature activation of overcurrent protection, and the delay in activating overcurrent protection. An example of reducing the delay in activating overcurrent protection is described below in conjunction with FIGS. 6, 7, 9, and 10.

Figure 10:
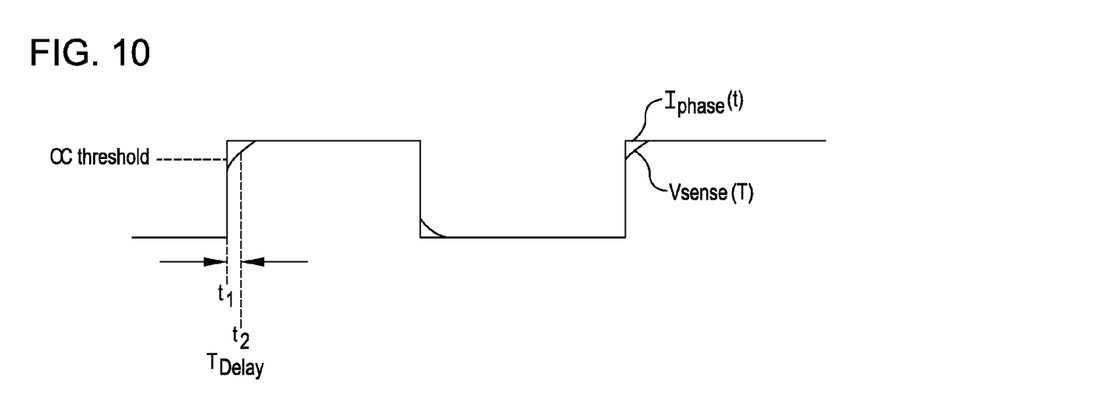
FIG. 10 is an overlay of time domain plots of an actual phase current of the power supply of FIG. 7 and of an overdamped sense signal that the sense circuit of FIG. 7 generates in response to the actual phase current, according to an embodiment.

FIG. 10 is a plot of $I_{phase}(t)$ of FIG. 7, and of an overdamped, i.e., lagging, $V_{sense}(t)$ of FIG. 7, according to an embodiment of the buck converter 70 of FIG. 7 in which the phase inductor 82 is a hard-saturation core inductor having an inductance-versus-current characteristic similar to that shown in FIG. 3.

Referring to FIGS. 6, 7, 9, and 10, as stated above, the core-structure 76 is designed such that the leakage inductance $L_{leak}$ is substantially independent of $I_{phase}(t)$.

Consequently, even if the sense circuit 72 overdamps $V_{sense}(t)$ and the over-current threshold $OC_{threshold}$ is set above the saturation threshold of the primary inductor 82, the delay $T_{delay}$ between the time $t_1$ when $I_{phase}(t)$ equals or exceeds $OC_{threshold}$ and the time $t_2$ when $V_{sense}(t)$ is high enough to cause the controller 18 to activate over-current protection is significantly shorter than $T_{delay}$ (FIG. 6) resulting from the overdamped $V_{sense}(t)$ of FIG. 6.

Referring again to FIG. 7, the sense circuit 72 may provide other advantages. For example, because the magnitude of the current flowing through the auxiliary winding 80, the resistor 36, and the sense capacitor 38 may be negligible compared to the magnitude of the current $I_{phase}(t)$, including the auxiliary winding in the sense circuit does not significantly increase the power consumption of the buck converter 70 as compared to the power consumption of the buck converter 10 of FIG. 1. Furthermore, because the resistor 36 of the sense circuit 72 can be smaller than the counterpart resistor of the sense circuit 30 of FIG. 1, there may be less power loss in the resistor of the sense circuit 72 than there is in the resistor of the sense circuit 30. Moreover, because the resistor 36 of the sense circuit 72 may be smaller than the counterpart resistor of the sense circuit 30, the signal-to-noise (SNR) of $V_{sense}(t)$ generated by the sense circuit 72 may be higher than the SNR of $V_{sense}(t)$ generated by the sense circuit 30—the smaller the resistor 36, the less thermal noise it generates, and the smaller the resistor 36 as compared to the sense capacitor 38, the higher the power of the signal that appears across the sense capacitor such that $V_{sense}(t)$ has a greater signal power as compared to the signal across the resistor 36. In addition, including the auxiliary winding 80 in the core structure 76 may add a relatively small cost (e.g., US$0.005-US$0.10) to the core structure, and may result in little or no increase in the size of the core structure.

Still referring to FIG. 7, alternate embodiments of the sense circuit 72 and the core structure 76 are contemplated. For example, the core structure 76 may be manufactured and provided as a single component (see FIGS. 11-12). Alternatively, the core structure 76, resistor 36, and sense capacitor 38 may be manufactured and provided as a single module (the amplifier 40 may also be included in the module). Furthermore, the core structure 76, resistor 36, sense capacitor 38, and one or more other components of the buck converter 70 may be manufactured and provided as a single module. In addition, the sense circuit 72 may be used, or modified for use, in a multiphase buck converter (see FIG. 16) and in single-phase and multiphase power supplies other than a buck converter.

Figure 11:
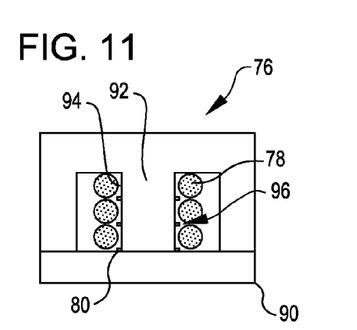
FIG. 11 is a cutaway view of a core structure that includes the primary and auxiliary windings of the power supply of FIG. 7, according to an embodiment.

FIG. 11 is cut-away view of the core structure 76 of FIG. 7, according to an embodiment.

Figure 12:
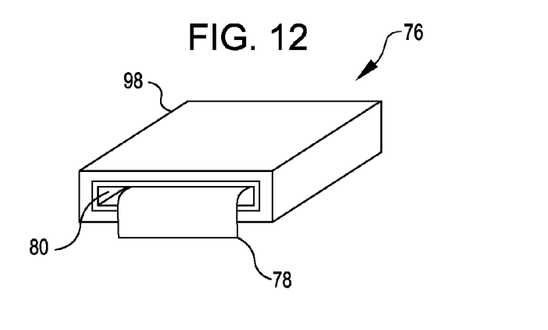
FIG. 12 is an isometric view of the core structure of FIG. 11, according to an embodiment.

FIG. 12 is an end view of the core structure 76 of FIGS. 7 and 11, according to an embodiment.

Referring to FIGS. 11-12, in addition to the primary winding 78 and the auxiliary winding 80, the core structure 76 includes a core 90 having a center leg 92 with a surface 94.

The core 90 may be formed from any suitable core material.

The primary winding 78 is wound about the center leg 92 of the core 90.

Because the auxiliary winding 80 is configured to carry a significantly smaller current than the primary winding 78 is configured to carry, the cross-sectional area of the auxiliary winding is significantly smaller than the cross-sectional area of the primary winding.

The smaller cross-sectional area of the auxiliary winding 80 allows the auxiliary winding to be wound about the center leg of the core 90 in gaps 96 formed between the primary winding 78 and the surface 90.

Locating the auxiliary winding 80 in the gaps 96 may allow the size of the core structure 76 to remain approximately the same as the size of a core structure that includes a primary winding only.

Referring to FIG. 12, the core structure 76 may also include a housing or package 98, such as an injection-molded epoxy package, in which the windings 78 and 80 and the core 90 are disposed.

Still referring to FIGS. 11-12, other embodiments of the core structure 76 are contemplated. For example, the core 90 may include multiple center legs 92 about which multiple primary-winding/auxiliary-winding pairs are wound. The core 90 may be configured to promote magnetic coupling between the primary windings of two or more of these pairs, or to magnetically isolate the primary windings of two or more of these pairs. In the example in which the core 90 is configured to promote magnetic coupling between the primary windings of multiple ones of these primary-winding/auxiliary-winding pairs, the auxiliary windings 80 may be wound on legs separate from the legs about which the respective primary windings 78 are wound so that for each auxiliary winding, the core promotes magnetic coupling with only the paired primary winding. Moreover, although shown as having three turns, the primary windings 78 and the auxiliary windings 80 may each have more or fewer than three turns, the number of turns of a primary winding may be different than the number of turns of its paired auxiliary winding, a primary winding may have a different number of turns than one or more other primary windings or one or more auxiliary windings, and an auxiliary winding may have a different number of turns than one or more other auxiliary windings or one or more primary windings. In addition, the primary and auxiliary windings 78 and 80 may have a round cross section as shown in FIG. 11, a rectangular cross section as shown in FIG. 12, or any other suitable cross section.

Figure 13:
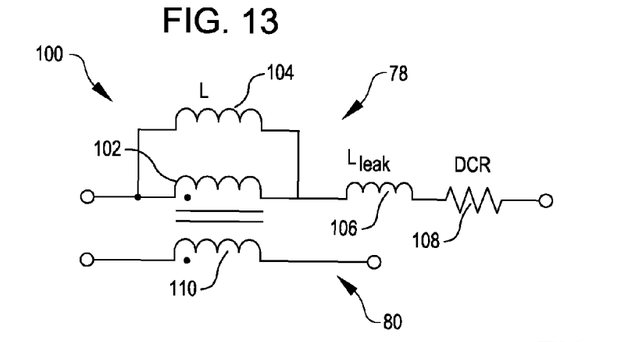
FIG. 13 is a first-order circuit model of the core structure of FIG. 11, according to an embodiment.

FIG. 13 is a diagram of a circuit model 100 of the core structure 76 of FIGS. 7 and 11-12, according to an embodiment.

The primary winding 78 is modelled as including a coupling (also called a magnetizing) inductor 102, a primary inductor 104 in parallel with the coupling inductor, a leakage inductor 106 in series with the parallel combination of the coupling and primary inductors, and a series-equivalent resistor 108—in FIG. 7, the parallel combination of the coupling inductor 102 and the primary inductor 104 is represented by a single inductor 82. The main inductance 104 has an inductance L, the leakage inductor 106 has an inductance $L_{leak}$, the total inductance $L_{total}$ of the primary winding 78 is $L+L_{leak}$, and the resistor 108 has a resistance DCR.

And the auxiliary winding 80 is modeled as including a coupling inductor 110. Although the auxiliary winding 80 may also be modelled as including an auxiliary inductor in parallel with the coupling inductor 110, a leakage inductor in series with the parallel combination of the auxiliary and coupling inductors, and a series-equivalent resistor in series with the leakage inductor, the values of the auxiliary inductor, leakage inductor, and series-equivalent resistor are negligible for the applications described above in conjunction with FIGS. 7-10 and below in conjunction with FIG. 14; therefore, these components are omitted from FIG. 13.

Figure 14:
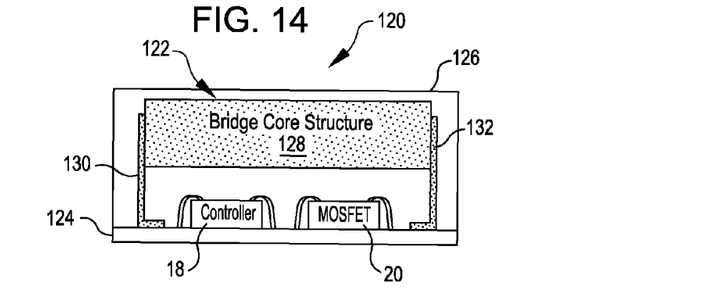
FIG. 14 is a cutaway side view of a power-supply module that includes the power supply of FIG. 7 and in which the core structure of FIG. 7 is disposed over the other components of the power supply, according to an embodiment.

FIG. 14 is a cutaway plan view of a power-supply module 120, which may have a topology that is similar to the topology of the buck converter 70 of FIG. 7, according to an embodiment. The module 120 includes a bridge-inductor structure 122, which may be disposed over other components, such as the controller 18 and high-side transistor 20, of the buck converter 70, and which may otherwise be similar to the core structure 76 of FIG. 7. The bridge-inductor structure 122 may reduce the area of the module 120 as compared to a power-supply module where an inductor core structure is disposed laterally adjacent to the other components of the module.

In addition to the controller 18, transistor 20, and the bridge-inductor structure 122, the module 120 includes a platform 124, a package 126, and external connection leads or pads (not shown in FIG. 14). The platform 124 may be any suitable component carrier such as a printed circuit board, a lead frame, or a combination of a printed circuit board and a lead frame, and the package 126 may be made from any suitable material such as injection-molded epoxy.

The bridge-inductor structure 122 includes a core structure 128, which may be similar to the core structure 76 of FIG. 7, and primary-winding leads 130 and 132, which are configured to be attached to the platform 124 and to support the core structure over other components of the module 120. The bridge-inductor structure 122 also includes auxiliary winding leads (not shown in FIG. 14) that are disposed adjacent to the primary-winding leads 130 and 132, that are configured to be attached to the platform 124, and that may also be configured to support the core structure 128.

Still referring to FIG. 14, alternate embodiments of the power-supply module 120 and bridge-inductor structure 122 are contemplated. For example, referring to U.S. Patent Publication 2011/0228507, which is incorporated by reference, one can replace each of one or more of the inductors disclosed in the '507 publication with the core structure 128.

Figure 15:
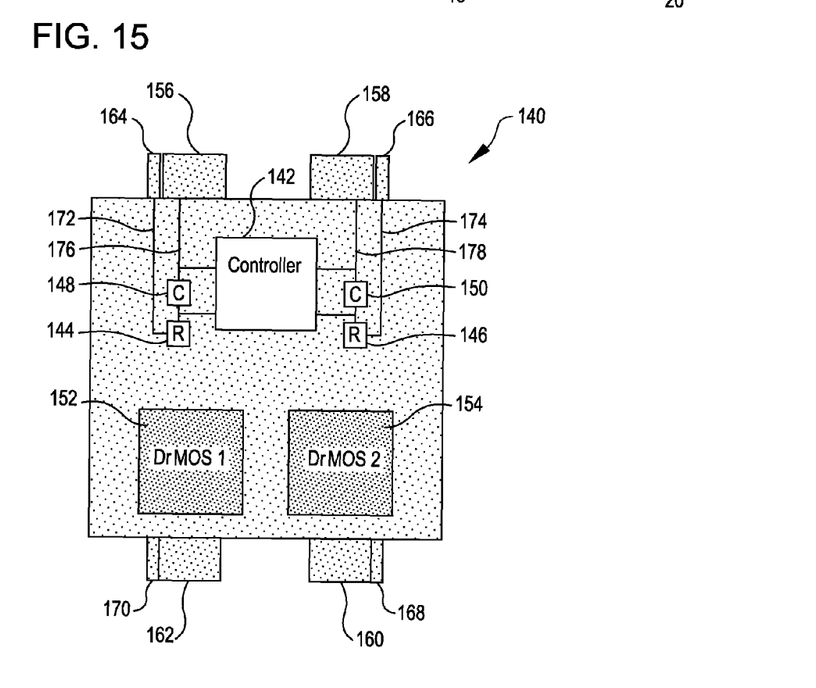
FIG. 15 is a cutaway top view of the power-supply module of FIG. 14, according to an embodiment.

FIG. 15 is a cutaway plan view of a two-phase power-supply module 140, according to an embodiment. In FIG. 15, bridge-inductor structures (one per phase), which are disposed over a controller 142, sense-circuit resistors 144 and 146, sense capacitors 148 and 150, and transistors 152 and 154, have primary-winding leads 156, 158, 160, and 162, and have auxiliary-winding leads 164, 166, 168, and 170. The resistors 144 and 146 are coupled to the auxiliary leads 164 and 166 with conductive traces 172 and 174, and the sense capacitors 148 and 150 are coupled to the primary leads 156 and 158 with conductive traces 176 and 178 (respective portions of the traces 176 and 178 may be disposed under the resistors 144 and 146, respectively) such that all of the traces may be located on a single side of a platform 180; therefore, the platform may be a single-conductive-layer platform instead of a multi-conductive-layer platform. Furthermore, one may configure the module 140 to operate as a multiphase, single-voltage, power supply by coupling together the leads 156 and 158, and the leads 160 and 162; otherwise, the module is configured to operate as a dual-output-voltage power supply, one bridge-inductor per output voltage.

Still referring to FIG. 15, alternate embodiments of the power-supply module 140 are contemplated. For example, the power-supply module 140 may include more or fewer than two phases.

Figure 16:
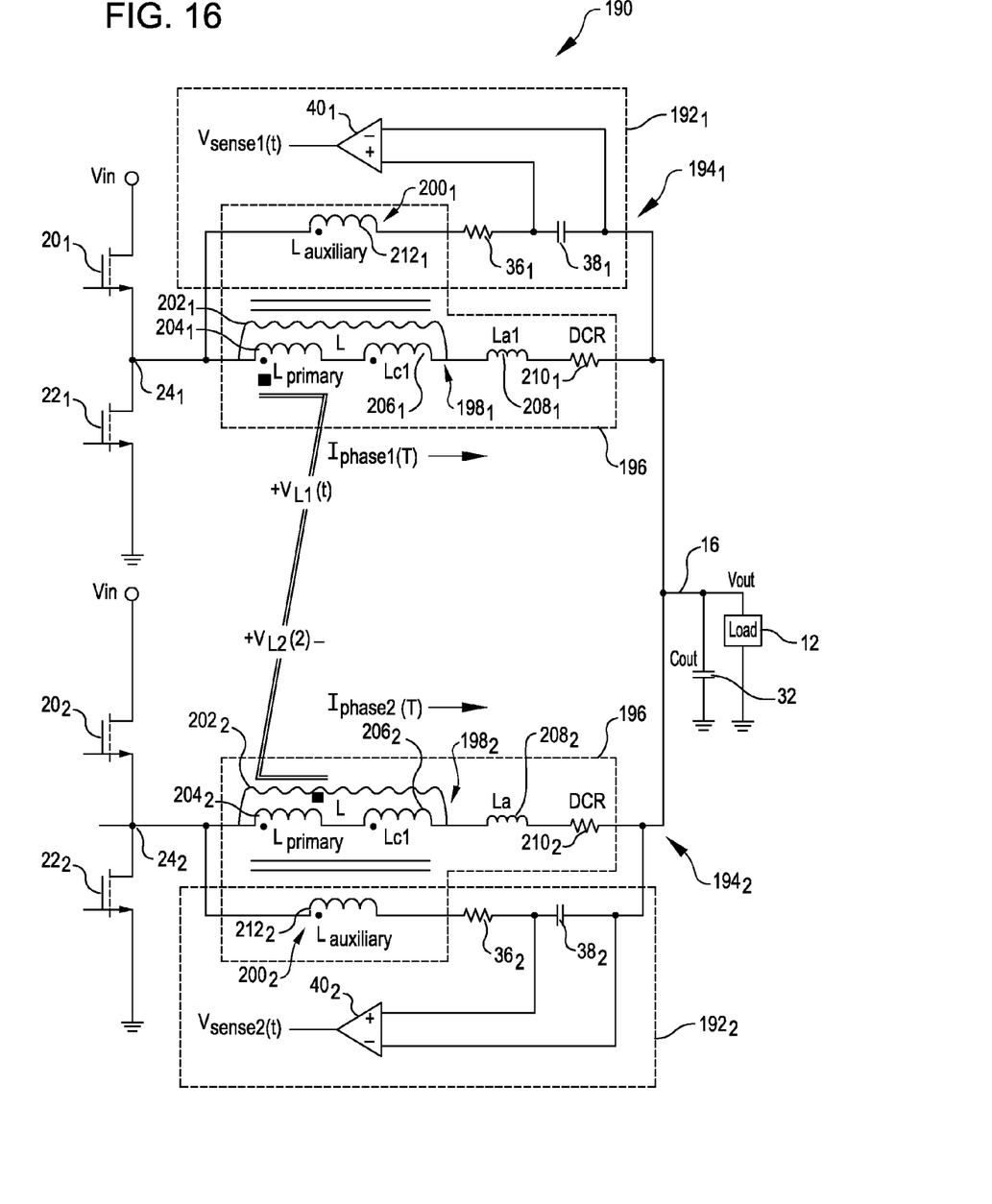
FIG. 16 is a diagram of a load and of a portion of a multiphase coupled-inductor power supply that includes one sensing circuit per phase, according to an embodiment.

FIG. 16 is a diagram of the load 12, and of a portion of a coupled-inductor buck converter 190, which powers the load and which includes an embodiment of a phase-current sense circuit 192 that ameliorates or eliminates one or more of the above-described potential problems with the phase-current sense circuit 30 of FIG. 1, and which also allows for sensing phase currents in a coupled-inductor power supply. In FIG. 16, like numerals reference like components common to the buck converter 10 of FIG. 1, the buck converter 70 of FIG. 7, and the buck converter 190.

In addition to the potential problems with the phase-current sense circuit 30 of FIG. 1 discussed above in conjunction with FIGS. 1-6, another problem with the sense circuit 30 is that it cannot sense $I_{phase}(t)$ in a phase of a multiphase coupled-inductor power supply.

But as described below, the sense circuit 192 can sense $I_{phase}(t)$ not only in a phase of a non-coupled-inductor power supply, but also in a phase of a coupled-inductor power supply.

In addition to a controller, feedback network (neither the controller nor the feedback network are shown in FIG. 16), and the output capacitor 32, the buck converter 190 includes two magnetically coupled phases 194₁ and 194₂, which are coupled to the controller (the controller may be similar to the controller 18 of FIG. 7 but conventionally modified for multiple power-supply phases).

Each phase 194₁ and 194₂ includes a respective high-side transistor 20, low-side transistor 22, phase node 24, and sense circuit 192, and the phases share a common coupled-inductor core structure 196.

The coupled-inductor core structure 196 includes two primary windings 198₁ and 198₂ and two auxiliary windings 200₁ and 200₂.

Each primary winding 198 includes, or can be modelled as including, a primary inductor 202 having an inductance L, a coupling inductor 204 having a coupling inductance $L_{primary}$, a coupling-leakage inductor 206 having a coupling-leakage inductance $L_{cl}$, an auxiliary leakage inductor 208 having an auxiliary-leakage inductance $L_{al}$, and a series-equivalent resistor 210 having a series-equivalent resistor DCR. The coupling-leakage inductor 206₁ represents the leakage inductance $L_{cl}$ of the primary winding 198₁ relative to the primary winding 198₂. And the auxiliary-leakage inductor 208₁ represents the leakage inductance $L_{al}$ of the primary winding 198₁ relative to its corresponding auxiliary winding 200₁. A similar analysis may be made for the primary winding 198₂ and the auxiliary winding 200₂.

Each auxiliary winding 200 includes, or may be modelled as including, a coupling inductor 212 having a coupling inductance $L_{auxiliary}$; in an embodiment, the turns ratio between the auxiliary winding and the portion of the primary winding 198 forming the series combination of the coupling inductor 204 and the coupling-leakage inductor 206 is 1:1 such that $L_{primary}+L_{cl}$ is approximately equal to $L_{auxiliary}$—note that even though the leakage inductor 206 represents the leakage inductance $L_{cl}$ of the primary winding 198 relative to the primary winding 198 of the other phase 194, the inductor 206 is a coupling inductor relative to the auxiliary winding 200 of the same phase 194. Although the auxiliary winding 200 includes, or may be modelled as including, an auxiliary inductance, a series-equivalent resistor, a leakage inductor that represents the leakage inductance of the auxiliary winding relative to the primary winding of the same phase 194, and a leakage inductor that represents the leakage inductance of the auxiliary winding relative to the primary winding of the other phase 194, the values of these four auxiliary-winding components are negligible for the applications described herein; therefore, these four components are omitted from FIG. 16.

And each sense circuit 192 includes the resistor 36, the sense capacitor 38, the sense-signal amplifier 40, and the auxiliary winding 200.

The operation of each sense circuit 192 and each primary-winding-auxiliary-winding pair is now described according to an embodiment; in other aspects, the operation of the coupled-inductor buck converter 190 may be similar to the operation of a conventional coupled-inductor buck converter. For clarity, the operations of the sense circuit 192₁, primary winding 198₁, and auxiliary winding 200₁ are described in detail, it being understood that the sense circuit 192₂, primary winding 198₂, and auxiliary winding 200₂ may operate in respective similar manners.

As the phase current $I_{phase\_1}(t)$ flows through the primary winding 198₁, a voltage $V_{L1}(t)$ exists across the primary inductor 202₁.

Assuming that the turns ratio between auxiliary winding 200₁ and the portion of the primary winding 198₁ that forms the series combination of the inductors 204₁ and 206₁ is approximately 1:1, because the auxiliary inductor 212₁ and the series combination of the inductors 204₁ and 206₁ and have a common node coupled to the phase node 24₁, approximately the same voltage $V_{L1}(t)$ exists across the auxiliary inductor.

Consequently, the voltage across the series combination of the leakage inductor 208₁ and the resistor 210₁ is approximately the same as the voltage across the series combination of the resistor 36₁ and the sense capacitor 38₁ because these two series combinations have a common node coupled to the output node 16.

As a result, the sense voltage $V_{sense1}(s)$ is given by the following equation:

$$V_{sense1}(s) = I_{Phase1}(s) \cdot DCR \frac{1 + s\frac{L_{al}}{DCR}}{1 + sR_{36\_1}C_{38\_1}} \quad (5)$$

Consequently, equation (5) is similar to equation (4), and the sense circuits 192 provide advantages similar to advantages (e.g., higher pole and zero frequencies, less dependence of $V_{sense1}(s)$ on $I_{phase1}(t)$ and temperature) that the sense circuit 72 provides as described above in conjunction with FIGS. 7-10.

Furthermore, because the voltage across the auxiliary inductor 212₁ takes into account all of the current components (magnetically induced and voltage induced) of $I_{phase1}(t)$, $V_{sense1}(t)$ provides an accurate representation of $I_{phase1}(t)$; in contrast, as described above, $V_{sense}(t)$ generated by the sense circuit 30 of FIG. 1 would not be an accurate representation of $I_{phase1}(t)$ of FIG. 16 because the sense circuit 30 would be unable to account for the magnetically induced components of $I_{phase1}(t)$.

Still referring to FIG. 16, alternate embodiments of the coupled-inductor buck converter 190 are contemplated. For example, the buck converter 190 may include more than two magnetically coupled phases 194, and may also include a combination of two or more magnetically coupled phases and one or more magnetically isolated phases (not shown in FIG. 16). Furthermore, although the inductors and resistors of the core structure 196 are described as being respectively equal, the resistors and one or more of the inductors of the phase 194₁ may have different respective values than the resistors and one or more of the inductors of the phase 194₂. Moreover, the core structure 196 may be manufactured and provided as a separate unit, the core structure and the sense circuits 192 may be manufactured and provided as a phase-sense module (if the amplifiers 40 are disposed on the controller, then the amplifiers may be omitted from such a module), or the core structures, sense circuits 192, and one or more other components of the buck converter 190 may be manufactured and provided as a power-supply or other type of module. In addition, the core structures 196 and sense circuits 192 may be included, or modified for inclusion, in power supplies (e.g., boost, buck-boost) other than a buck converter.

Figure 17:
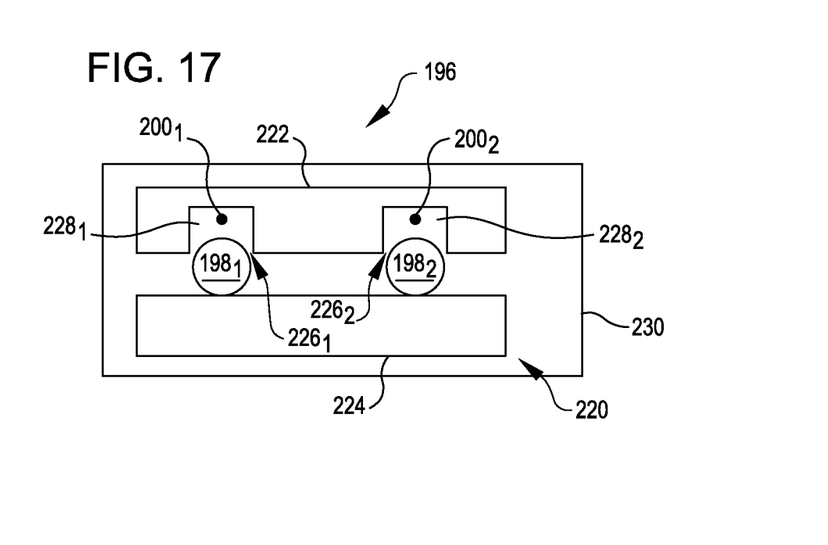
FIG. 17 is a cutaway view of a core structure that includes the primary and auxiliary windings of the power supply of FIG. 16, according to an embodiment.

FIG. 17 is cut-away view of the core structure 196 of FIG. 16, according to an embodiment.

In addition to the primary windings $198_1$ and $198_2$ and the auxiliary windings $200_1$ and $200_2$, the core structure 196 includes a core 220 having an upper plate 222 and a lower plate 224.

The core 220 may be formed from any suitable core material. And the upper plate 222 may be formed from a material that is different from the material from which the lower plate 224 is formed.

The primary windings $198_1$ and $198_2$ are disposed in notches $226_1$ and $226_2$ of the upper plate 222, and are one-turn windings.

Because the auxiliary windings $200_1$ and $200_2$, which are one-turn windings, are configured to carry significantly smaller currents than the respective primary windings $198_1$ and $198_2$ are configured to carry, the cross-sectional areas of the auxiliary winding are significantly smaller than the cross-sectional areas of the respective primary windings; that is, the auxiliary windings are significantly thinner than the primary windings.

The smaller cross-sectional areas of the auxiliary windings $200_1$ and $200_2$ allow the auxiliary windings to be disposed in the notches $226_1$ and $226_2$, respectively, in gaps $228_1$ and $228_2$ above the primary windings $198_1$ and $198_2$, respectively.

Locating the auxiliary windings 200 in the gaps 228 may allow the size and cost of the core structure 196 to remain approximately the same as the size of a core structure that includes primary windings only.

The core structure 196 may also include a housing or package 230 in which the windings 198 and 200, and the core 220, are disposed.

Still referring to FIG. 17, other embodiments of the core structure 196 are contemplated. For example, the alternate embodiments described above in conjunction with the core structure 76 of FIGS. 11-12 may be applicable to the core structure 196. Furthermore, the core structure 196 may include more than two primary windings 198 and more than two auxiliary windings 200. Moreover, at least one of the primary windings may be magnetically isolated from one or more of the other primary windings. In addition, although shown as having one turn, the primary windings 198 and the auxiliary windings 200 may each have more than one turn, the number of turns of a primary winding may be different than the number of turns of its paired auxiliary winding, a primary winding may have a different number of turns than one or more other primary windings or one or more auxiliary windings, and an auxiliary winding may have a different number of turns than one or more other auxiliary windings or one or more primary windings.

Figure 18:
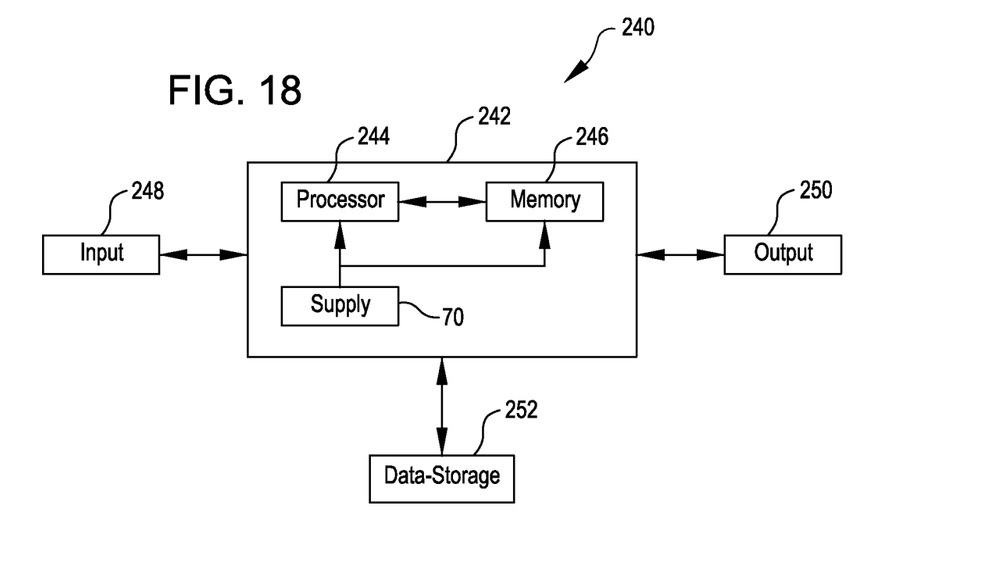
FIG. 18 is a diagram of a system that includes one or more power supplies of FIG. 7, 14, 15, or 16, according to an embodiment.

FIG. 18 is a block diagram of an embodiment of a device or system (hereinafter "system") 240, which incorporates one or more of the buck converters 70 and 190 of FIGS. 7 and 16, or one or more of the power-supply modules 120 and 140 of FIGS. 14-15, according to an embodiment; but for brevity, the system is described below as including only a single instance of the buck converter 70 of FIG. 7. Examples of the system 240 include, but are not limited to, a smart phone, pad computer, laptop computer, or personal computer.

The system 240 includes computing circuitry 242, which includes the buck converter 70, a processor 244, and memory 246, and also includes at least one input device 248, at least one output device 250, and at least one data-storage device 252.

The processor 244 may control the operations of the buck converter 70. For example, the functions of the buck converter's control circuitry 18 (FIG. 7) may be performed by the processor 244. The processor 244 may be a microprocessor, microcontroller, a field-programmable gate array, or any other computing circuit.

The memory 246 may be a volatile memory, non-volatile memory, or a combination of volatile and nonvolatile memory, and may store program instructions or firmware for the processor 244.

The input device (e.g., keyboard, mouse) 248 may allow a user of the system 240 to provide of data, programming instructions, firmware, and commands to the computing circuitry 242.

The output device 250 may include one or more displays configured to render output data from the computing circuitry 242. For example, the output device 250 may include a liquid-crystal display (LCD) for a smart phone. Such a display allows the computing circuitry 162 to provide data in a form (e.g., still image or video) perceivable by a human operator.

And the data-storage device (e.g., flash drive, hard-disk drive, RAM, EPROM, EEPROM, optical drive) 252 allows for the non-volatile storage of, e.g., programs and data.

Still referring to FIG. 18, alternate embodiments of the system 240 are contemplated.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, and these one or more ICs may be coupled to one or more other ICs. In addition, any described component or operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system.

What is claimed is:

1. A coupled-inductor structure, comprising:
    a first winding configured to conduct a first current, having a first node configured for coupling to a first phase node of a power supply, and having a second node configured for coupling to an output node of the power supply and to a first node first sense-impedance element that is configured to generate, across the first node and a second node of the first sense-impedance element, a first sense signal representative of the first current;
    a second winding configured for magnetic coupling with the first winding, having a first node coupled to the first node of the first winding, and having a second node configured for coupling to the second node of the first sense-impedance element;
    a third winding configured to conduct a second current, having a first node configured for coupling to a second phase node of the power supply, and having a second node configured for coupling to the output node of the power supply and to a first node of a second sense-impedance element that is configured to generate, across the first node and a second node of the second sense-impedance element, a second sense signal representative of the second current; and a fourth winding configured for magnetic coupling with the third winding, having a first node coupled to the first node of the third winding, and having a second node configured for coupling to a second node of the second sense-impedance element, wherein the third winding is configured for magnetic isolation from the first winding.

2. The coupled-inductor structure of claim 1, further comprising:
a core; and
wherein the first and second windings are wound about the core.

3. The coupled-inductor structure of claim 1 wherein a cross-sectional area of the first winding is larger than a cross-sectional area of the second winding.

4. The coupled-inductor structure of claim 1 wherein a leakage inductance associated with the first winding is higher than a leakage inductance associated with the second winding.

5. The coupled-inductor structure of claim 1 wherein a ratio between a number of turns of the first winding and a number of turns of the second winding is approximately equal to one.

6. A module, comprising:
a first winding having first and second nodes and configured to conduct a first current;
a second winding having a first node coupled to the first node of the first winding, having a second node, and configured for magnetic coupling to the first winding;
a first passive impedance element coupled between the second node of the first winding and the second of the second winding, and configured to generate a first signal that represents the first current;
a third winding having first and second nodes and configured to conduct a second current;
a fourth winding having a first node coupled to the first node of the third winding, having a second node, and configured for magnetic coupling to the third winding; and
a second node, and configured for magnetic coupling to the third winding; and
a third passive impedance element coupled between the second node of the third winding and the second node of the fourth winding, and configured to generate a second signal that represents the second current,
wherein the third winding is configured for magnetic isolation from the first winding.

7. The module of claim 6 wherein:
the first winding is configured for use as a phase inductor of a switching power supply; and
the current includes a phase current of the switching power supply.

8. The module of claim 6 wherein the first winding includes:
a coupling portion; and
a leakage portion serially coupled to the coupling portion.

9. The module of claim 6, further comprising:
a core; and
wherein the first and second windings are wound about the core.

10. The module of claim 6 wherein the second winding has a smaller cross-sectional area than the first winding.

11. The module of claim 6 wherein the first passive impedance element includes a capacitor configured to generate a voltage as the first signal.

12. The module of claim 6, further comprising a second passive impedance element that is serially coupled to the first passive impedance element.

13. The module of claim 12 wherein the second passive impedance element includes a resistor.

* * * * *

UNITED STATES PATENT AND TRADEMARK OFFICE
CERTIFICATE OF CORRECTION

PATENT NO.         : 9,720,429 B2
APPLICATION NO.    : 14/627089
DATED              : August 1, 2017
INVENTOR(S)        : Jiang et al.

Page 1 of 2

It is certified that error appears in the above-identified patent and that said Letters Patent is hereby corrected as shown below:

On the Title Page

In Item (63), under "Related U.S. Application Data", in Column 1, Line 2, delete "2014." and insert -- 2014, now Pat. No. 9,696,739. --, therefor.

In the Drawings

In Fig. 6, Sheet 3 of 8, delete "Vsense(I)" and insert -- Vsense(t) --, therefor.

In Fig. 10, Sheet 5 of 8, delete "Vsense(T)" and insert -- Vsense(t) --, therefor.

In Fig. 16, Sheet 7 of 8, delete "Iphase1(T)" and insert -- Iphase1(t) --, therefor.

In Fig. 16, Sheet 7 of 8, delete "Iphase2(T)" and insert -- Iphase2(t) --, therefor.

In Fig. 18, Sheet 8 of 8, for Tag "70", Line 1, delete "Supply" and insert -- Buck Converter --, therefor.

In the Specification

In Column 1, Line 9, delete "applications are" and insert -- are --, therefor.

In Column 3, Line 46, delete "controller 14" and insert -- controller 18 --, therefor.

In Column 4, Line 5, delete "active" and insert -- adaptive --, therefor.

In Column 7, Line 15, delete "It" and insert -- If --, therefor.

In Column 9, Line 31, delete "$L_{primary}$)," and insert -- $L_{primary}$); --, therefor.

Signed and Sealed this
Fifteenth Day of May, 2018

Andrei Iancu
*Director of the United States Patent and Trademark Office*

CERTIFICATE OF CORRECTION (continued)
U.S. Pat. No. 9,720,429 B2

In Column 9, Line 39, delete "underamped" and insert -- underdamped --, therefor.

In Column 10, Lines 18-19, delete "signal-to-noise" and insert -- signal-to-noise-ratio --, therefor.

In Column 10, Line 46, delete "FIG. 11 is cut-away" and insert -- FIG. 11 is a cut-away --, therefor.

In Column 10, Line 67, delete "surface 90." and insert -- surface 94. --, therefor.

In Column 15, Line 4, delete "FIG. 17 is cut-away" and insert -- FIG. 17 is a cut-away --, therefor.

In Column 16, Line 15, delete "provide of" and insert -- provide --, therefor.

In Column 16, Line 22, delete "computing circuitry 162" and insert -- computing circuitry 242 --, therefor.

In the Claims

In Column 16, Line 55, in Claim 5, delete "node first" and insert -- node of a first --, therefor.

In Column 17, Line 37, in Claim 6, delete "second of" and insert -- second node of --, therefor.

In Column 18, Line 6, in Claim 6, delete "and".